United States Patent [19]

Liu

[11] Patent Number: 4,564,655
[45] Date of Patent: Jan. 14, 1986

[54] POLYCARBONATE COMPOSITIONS

[75] Inventor: Ping Y. Liu, Naperville, Ill.

[73] Assignee: General Electric Company, Mt. Vernon, Ind.

[21] Appl. No.: 680,330

[22] Filed: Dec. 10, 1984

[51] Int. Cl.$^4$ ............................................. C08L 69/00
[52] U.S. Cl. ..................................... 525/92; 524/508; 525/146; 525/901; 525/940
[58] Field of Search ................. 525/92, 146, 901, 940; 524/508

[56] References Cited

U.S. PATENT DOCUMENTS 3,431,224  3/1969  Goldblum .............................. 524/46
4,102,854  7/1978  Gergen et al. .......................... 525/92
4,481,331  11/1984  Liu ....................................... 525/901

Primary Examiner—Theodore E. Pertilla
Attorney, Agent, or Firm—Myron B. Kapustij; Martin B. Barancik

[57] ABSTRACT

Polycarbonate composition exhibiting improved resistance to organic solvents comprised of, in admixture:
(i) at least one high molecular weight thermoplastic aromatic polycarbonate resin;
(ii) at least one selectively hydrogenated linear, sequential or radial teleblock copolymer resin of a vinyl aromatic compound $(A)_n$ and $(A')_n$ and an olefinic elastomer (B), of the A—B—A', A—(B—A—B)$_n$, A(BA)$_n$B, (A)$_4$B, B(A)$_4$ or B((AB)$_n$B)$_4$ type wherein $n$ is an integer of from 1 to 10; and
(iii) at least one olefin-rubbery diene terpolymer; components (ii) and (iii) being present in amounts effective to improve the organic solvent resistance of said composition.

The instant composition is useful in the production of extruded sheets and films, and injection or blow molded articles.

13 Claims, No Drawings

POLYCARBONATE COMPOSITIONS

BACKGROUND OF THE INVENTION

Aromatic carbonate polymers are well known thermoplastic materials which, due to their many advantageous properties, find use as thermoplastic engineering materials. The aromatic polycarbonates exhibit, for example, excellent properties of toughness, impact resistance, heat resistance, and dimensional stability. However, in certain applications the use of aromatic polycarbonate resins is limited because they exhibit environmental stress crazing and cracking. "Environmental stress crazing and cracking" refers to the type of failure which is hastened by the presence of organic solvents such as, for example, gasoline, particularly high octane no lead gasoline, acetone, heptane and carbon tetrachloride when such solvents are in contact with the stressed parts fabricated from aromatic polycarbonates. The most significant effect is loss of vital impact strength and also an increase in brittle-type failure. Contact with such solvents may occur, for example, when parts are used under the hood of automobiles or near the gasoline filler ports thereof, or when solvents are used to clean or degrease stressed parts made from polycarbonate resins.

In Goldblum, U.S. Pat. No. 3,431,224, assigned to the same assignee as the instant application, it is proposed to add modifiers to polycarbonates, in certain proportions, the modifiers comprising at least one member selected from the class consisting of polyethylene, polypropylene, polyisobutylene, a copolymer of ethylene and an ethyl acrylate, a copolymer of ethylene and propylene, a cellulose ester, a polyamide, a polyvinyl acetal, an alkyl cellulose ether, and a polyurethane elastomer. While the results with such modifiers are generally excellent, in thin section, e.g., $\frac{1}{8}$ inch, it has been found that there is a tendency for failure to occur with these modifiers in thicker molded parts, e.g., $\frac{1}{4}$ inch thickness, and such failure is of the undesirable brittle type, especially after exposure to high test gasoline. Another modifier proposed to be added to polycarbonate is reported in Research Disclosure No. 20810, Dow Chemical Company, August, 1981. Data are provided showing that polycarbonate modified with a linear low density polyolefin, namely ethylene/octene-1 copolymer, provide good impact strength at increased part thickness. There is no suggestion therein that such a modifier will enhance resistance to environmental stress crazing and cracking. Still other modifiers have been proposed for impact strength improvement, and for slight improvement in optimum environmental stress crazing and cracking resistance. U.S. Pat. Nos. 4,444,949, 4,430,476, and 4,481,331. U.S. Pat. No. 4,444,949 describes polycarbonates modified with a combination of butadiene-styrene coupled block copolymer and, optionally, an olefin/acrylate copolymer. Such compositions process well and are toughened, but there is no disclosure of significant solvent resistance. U.S. Pat. No. 4,430,476 describes polycarbonates modified with a combination of the coupled block copolymers and a linear low density polyolefin. There is no mention that such modifier combinations will provide enhanced resistance to crazing and cracking. U.S. Pat. No. 4,481,331 describes polycarbonate modified with a vinyl aromatic and olefin elastomeric block copolymer and an olefin/acrylate copolymer or with a vinyl aromatic and olefin elastomeric block copolymer, an olefin/acrylate copolymer, and a polyolefin resin. Such compositions are toughened and exhibit an improvement in stress crazing and cracking.

SUMMARY OF THE INVENTION

The instant invention is directed to polycarbonate compositions exhibiting improved resistance to environmental stress crazing and cracking comprising, in admixture:

(i) at least one high molecular weight aromatic thermoplastic polycarbonate resin;

(ii) at least one compound comprised of a selectively hydrogenated linear, sequential or radial teleblock copolymer of a vinyl aromatic compound $(A)_n$ and $(A')_n$ and an olefinic elastomer (B) of the type A—B—A', A—(B—A—B)$_n$—A, A(BA)$_n$B, (A)$_4$B, B(A)$_4$, or B((AB)$_n$B)$_4$, wherein n is an integer of from 1 to 10 inclusive; and (iii) an olefin-rubbery diene terpolymer.

DESCRIPTION OF THE INVENTION

In accordance with the instant invention there are provided polycarbonate compositions which exhibit impproved resistance to environmental stress crazing and cracking, and which also exhibit improved ductility and thick section impact strength, particularly after exposure to organic solvents such as gasoline. The instant compositions are comprised of, in admixture:

(i) at least one high molecular weight aromatic thermoplastic polycarbonate resin;

(ii) at least one resin comprised of a selectively hydrogenated linear, sequential or radial teleblock copolymer of a vinyl aromatic compound $(A)_n$ and $(A')_n$ and an olefinic elastomer (B) of the type A—B—A', A—(B—A—B)$_n$—A, A(BA)$_n$B, (A)$_4$B, B(A)$_4$ or B((AB)$_n$B)$_4$ wherein n is an integer of from 1 to 10; and (iii) an olefin-rubbery dienec terpolymer, components (ii) and (iii) being present in amounts effective to impart to said compositions a resistance to environmental stress crazing and cracking greater than that possessed by polycarbonate resin, and also an improved ductility and thin section impact, particularly after exposure to organic solvents such as gasoline. These compositions are further essentially, or totally, free of an olefin/acrylate copolymer.

The high molecular weight aromatic thermoplastic polycarbonates which comprise one, and generally the major, component of the instant compositions are known materials which may be readily prepared by a variety of known processes such as, for example, the interfacial polymerization process, transesterification, melt polymerization, and the like. These polycarbonates, as well as methods for their preparation, are disclosed, inter alia, in U.S. Pat. Nos. 2,999,835, 3,028,365, 3,275,601, 3,334,154 and 3,989,672, all of which are hereby incorporated herein by reference.

A particularly useful process for the preparation of the polycarbonates useful in the instant invention is the interfacial polymerization process involving the reaction of at least one dihydric phenol with a carbonate precursor in the presence of an aqueous caustic solution, a water immiscible organic solvent such as methylene chloride, a catalyst, and a molecular weight regulator.

Typical of some of the dihydric phenols which may be employed in the preparation of the instant polycarbonates are 2,2-bis(4-hydroxyphenyl)propane (bisphenol-A); 1,1-bis(4-hydroxyphenyl)propane; 1,5-bis(4- hydroyphenyl)pentane; 1,1-bis(4-hydroxyphenyl)cyclohexane; 2,2-bis(3,5-dimethyl-4-hydroxyphenyl)propane; 2,2-bis(3,5-dibromo-4-hydroxyphenyl)propane; 1,3-bis(4-hydroxyphenyl)propane; 1,1-bis(3-chloro-5-methyl-4-hydroxyphenyl)butane; 4,4'-thiodiphenol; p,p'-dihydroxydiphenyl; bis(3,5-diisopropyl-4-hydroxyphenyl)sulfone; and bis(4-hydroxyphenyl)ether. Other useful dihydric phenols are disclosed in U.S. Pat. Nos. 2,999,835, 3,027,365, 3,334,154, 3,035,021, 3,036,036, 3,036,037, 3,036,039, and 4,111,910, all of which are incorporated herein by reference.

It is of course possible to employ a mixture of two or more different dihydric phenols or a copolymer of a dihydric phenol with a glycol or with hydroxy or acid terminated polyester, or with a dibasic acid in the event a carbonate copolymer or interpolymer rather than a homopolymer is desired. Also employed in the practice of this invention may be blends of any of the above materials to provide the aromatic carbonate polymer.

The carbonate precursor may be either a carbonyl halide, a carbonate ester, or a bishaloformate. The carbonyl halides which may be employed herein are carbonyl bromide, carbonyl chloride, and mixtures thereof. Typical carbonate esters which may be employed herein are diphenyl carbonate; di-(halophenyl)carbonates such as di(chlorophenyl)carbonate, di(bromophenyl)carbonate, di(trichlorophenyl)carbonate, etc.; di(alkylphenyl)carbonates such as di(tolyl)carbonate, etc.; di(naphthyl)carbonate; di(chloronaphthyl)carbonate; phenyl tolyl carbonate; chlorophenyl chloronaphthyl carbonate, etc, or mixtures thereof. The bishaloformates suitable for use herein include the bishalformates of dihydric phenols such as bischloroformate of hydroquinone, bischloroformate of bisphenol-A, and the like; or bishaloformates of glycols such as the bischloroformate of ethylene glycol, polyethylene glycol, neopentyl glycol, and the like. While other carbonate precursors will occur to those skilled in the art carbonyl chloride, also known as phosgene, is the preferred carbonate precursor.

The catalysts employed in the preparation of the instant polycarbonates can be any of the known materials which initiate the polymerization reaction between the dihydric phenol and the carbonate precursor. These catalysts include, but are not limited to, tertiary amines such as triethylamine, tripropylamine, N,N-dimethylaniline, quaternary ammonium compounds, and quaternary phosphonium compounds. The molecular weight regulators can be any of the known compounds that control or regulate the molecular weight of the polycarbonate by a chain terminating mechanism. These compounds include, but are not limited to, phenol, tertiarybutyl phenol, chroman-I, and the like.

Particularly useful polycarbonates are those containing recurring structural units represented by the general formula

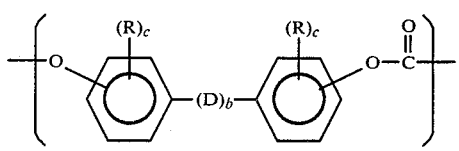

I.

wherein:
R is independently selected from halogen and monovalent hydrocarbon radicals;

D is selected from divalent hydrocarbon radicals,

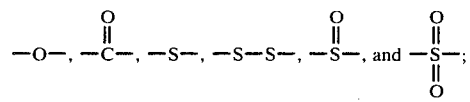

b is either zero or one; and
c is independently selected from integers having a value of from 0 to 4 inclusive.

The monovalent hydrocarbon radicals represented by R include the alkyl, cycloalkyl, aryl, aralkyl and alkaryl radicals. Preferred alkyl radicals are those containing from 1 to about 10 carbon atoms. Preferred cycloalkyl radicals are those containing from 4 to about 8 ring carbon atoms. Preferred aryl radicals are those containing from 6 to 12 ring carbon atoms, i.e., phenyl, biphenyl, and naphthyl. Preferred aralkyl and alkaryl radicals are those containing from 7 to about 14 carbon atoms.

The divalent hydrocarbon radicals represented by D are selected from alkylene, cycloalkylene, alkylidene, and cycloalkylidene radicals. The preferred alkylene radicals are those containing from 2 to about 20 carbon atoms. Preferred alkylidene radicals are those containing from 1 to about 20 carbon atoms. Preferred cycloalkylene and cycloalkylidene radicals are those containing from 4 to about 16 ring carbon atoms.

The instant polycarbonate preferably have a weight average molecular weight of from about 10,000 to about 200,000, preferably from about 20,000 to about 100,000. It is generally preferred that the instant polycarbonates have an intrinsic viscosity of at least about 0.4 dl/gm. in methylene chloride at 25° C.

Also included herein are the randomly branched thermoplastic aromatic polycarbonates which are obtained by the reaction of a dihydric phenol, a carbonate precursor, and a polyfunctional aromatic compound which acts as a branching agent. These polyfunctional aromatic compounds are well known in the art and contain at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like.

Also included herein are blends of linear and branched polycarbonates.

Included within the instant definition of polycarbonates are also the copolyester-carbonates. The copolyester-carbonates are polymers derived from a dihydric phenol, a carbonate precursor, and an ester precursor such as a difunctional carboxylic acid or an ester forming reactive derivative thereof. These copolyester-carbonate resins, as well as methods for their preparation, are disclosed, inter alia, in U.S. Pat. No. 3,169,121, which is hereby incorporated herein by reference.

The selectively hydrogenated linear, sequential or radial teleblock copolymers which comprise the second component of the multicomponent compositions of the instant invention are well known in the art and are generally commercially available or may readily be prepared by known methods.

Prior to hydrogenation the end blocks of these polymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha-methyl styrene, p-methyl styrene, vinyl xylene, ethyl vinyl xylene, vinyl naphthylene, and the like, or mixtures thereof. The end blocks (A) and (A') may be the same or different. They are preferably selected from styrene, alpha-methyl styrene, vinyl toluene, vinyl xylene, vinyl naphthylene, and especially styrene. The center block (B) may be derived from, for example, butadiene, isoprene, 1,3-pentadiene, 2,3-dimethylbutadiene, and the like, and it may have a linear, sequential or teleradial structure.

The selectively hydrogenated linear block copolymers are described in Haefel et al., U.S. Pat. No. 3,333,024, which is incorporated herein by reference.

The ratio of the copolymers and the average molecular weights can vary broadly, although the molecular weight of the center block should be greater than that of the combined terminal blocks. It is preferred to form terminal block A each having a weight average molecular weight of about 2,000 to about 60,000 and center block B, e.g., a hydrogenated polybutadiene block, with a weight average molecular weight of about 20,000 to 450,000. Still more preferably, the terminal blocks each have a weight average molecular weight of about 7,000 to about 35,000 while the hydrogenated polybutadiene polymer blocks have a weight average molecular weight between about 30,000 and 150,000. The terminal blocks will preferably comprise from about 20 to about 45% by weight, more preferably from about 25 to about 40% by weight of the total block polymer. The preferred copolymers will be those having a polybutadiene center block wherein from about 35 to about 55% of the butadiene block segment is the structure resulting from 1,2 addition.

The hydrogenated copolymer will have the average unsaturation reduced to less than 20% of the original value. It is preferred to have the unsaturation of the center block B reduced to 10%, or less, preferably 5%, or less, of its original value. After hydrogenation center blocks B derived from isoprene will have the ethylene butylene structure.

The block copolymers are formed by techniques well known to those skilled in the art. Hydrogenation may be conducted utilizing a variety of hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, e.g., from atmospheric to about 3000 psig. The usual range being between 100 and 1,000 psig at temperatures from 75° C. to 600° F. for times between 0.1 and 24 hours, preferably from 0.2 to 8 hours.

Hydrogenated block copolymers such as Kraton G-1650 and Kraton G-1651 from Shell Chemical Company, Polymers Division, have been found useful in the present invention. Also useful are the Solprenes or Phillips.

The radial teleblock copolymers of which the Solprenes are typical examples can be characterized as having at least three polymer branches with each branch of the radical block copolymer comprising terminal non-elastomeric segments, e.g. (A) and (A'), as defined hereinafore. The branches of the radial block polymer contain a terminal non-elastomeric segment attached to an elastomeric polymer segment, e.g. (B) as defined hereinafore. These are described in Marrs, U.S. Pat. No. 3,753,936 and in Zelinski, U.S. Pat. No. 3,281,383, both of which are incorporated herein by reference, and they are selectively hydrogenated by well known procedures. In any event, the term "selective hydrogenation" is used herein to contemplate polymers in which the non-elastomeric blocks (A) and (A') have been left unhydrogenated, i.e., aromatic.

The third component of the instant compositions is an olefin-rubbery diene polymer. These olefin-rubbery diene polymers are well known in the art and are generally commercially available or may be readily prepared by known conventional methods. They may be prepared by the reaction of an olefin with a rubbery diene. The olefins which may be reacted with the dienes are the known olefins, perferably the lower olefins such as ethylene, propylene, butylene, and the like, and more preferably ethylene and propylene. The dienes include the norbornenes such as norbornene, ethylidene norbornene, and the like, butadiene, pentadiene, isoprene, cyclopentadiene, cyclohexadiene, and the like. Preferred olefin-diene polymers are the trepolymers found by the reaction of two olefins with a rubbery diene. Particularly useful terpolymers are those of the EPDM family such as ethylene propylene diene terpolymers. Some illustrative non-limiting examples of the EPDM type terpolymers are ethylene propylene ethylidene norbornene, ethylene propylene butadiene, ethylene propylene pentadiene, ethylene propylene norbornene, and the like. These EPDM type terpolymers are well known in the art and are generally commercially available from several sources such as, for example, Epsyn 704 from Copolymer Rubber, and the Vistalon series from Exxon Chemicals such as Vistalon 3708, Vistalon 2504, and the like.

The amounts of components (i) and (iii) present in the instant compositions are amounts which are effective to upgrade the environmental stress crazing and cracking properties, i.e., resistance to organic solvents, and to upgrade the ductile and thick section impact properties, particularly after exposure to organic solvents such as gasoline, of the instant compositions. Greater than these amounts of (ii) and (iii) may be employed so long as the properties desired for a particular application of these compositions are substantially maintained. That is to say, the amounts of components (ii) and (iii) present in the instant compositions are amounts effective to improve the environmental stress crazing and cracking characteristics and ductile properties of the compositions but insufficient to significantly deleteriously affect substantially most of the other advantageous properties thereof.

Generally a minimum of about 2 weight percent of component (ii) and a minimum of about 1 weight percent of component (iii) are sufficient to observe an improvement in organic solvent resistance and ductility of the instant compositions. A minimum of about 4 weight percent of component (ii) and a minimum of about 2 weight percent of (iii) are preferred, while a mininum of about 5 weight percent of (ii) and a minimum of about 3 weight percent of component (iii) are preferred. A level of about 30 weight percent of component (ii) and about 20 weight percent of component (iii) should generally not be exceeded, preferably a level of about 20 weight percent of component (ii) and about 15 weight percent of component (iii), and more preferably a level of about 15 weight percent of component (ii) and about 10 weight percent of component (iii). Weight percent is measured as the amounts of components (ii) and (iii) present in the total of components (i), (ii) and (iii). Thus, the instant compositions contain from about 50 to about 97 weight percent of component (i), from about 2 to about 30 weight percent of component (ii), and from about 1 to about 20 weight percent component (iii); preferably from about 65 to about 94 weight percent of component (i), from about 4 to about 20 weight percent of component (ii), and from about 2 to about 15 weight percent of component (iii); and more preferably from about 85 to about 92 weight percent of component (i), from about 5 to about 15 weight percent of component (ii), and from about 3 to about 10 weight percent of component (iii).

DESCRIPTION OF THE PREFERRED EMBODIMENTS

In order that those skilled in the art may better understand how the present invention may be practiced, the following examples are given by way of illustration and not by way of limitation. In the examples all parts and percentages are parts and percentages by weight unless otherwise specified.

The following examples illustrate compositions falling outside the scope of the instant invention. They are presented for comparative purposes only.

EXAMPLE 1

A composition containing 100 parts by weight of an aromatic polycarbonate resin derived from phosgene and 2,2-bis(4-hydroxyphenyl)propane and having an intrinsic viscosity, as determined in methylene chloride at 25° C., of from about 0.45 to about 0.49 dl./gm. was fed to an extruder operating at about 255° C. The resulting extrudate was comminuted into pellets and the pellets were injection molded at about 265° C. to 285° C. into test specimens measuring 57.2 mm×12.7 mm×3.2 mm thick and 63.5 mm×12.7 mm×6.4 mm thick.

EXAMPLE 2

A composition containing 90 parts by weight of the polycarbonate of Example 1 and 10 parts by weight of a selectively hydrogenated styrene-butadiene-styrene block copolymer (Shell Chemical Kraton G 1650) was prepared by blending the ingredients together by mechanically mixing them in a laboratory tumbler. The resulting mixture was fed to an extruder operating at a temperature of about 255° C. The extrudate was comminuted into pellets and the pellets were injection molded at about 265° to about 285° C. inot test specimens measuring 57.2 mm×12.7 mm×3.2 mm thick and 63.5 mm×12.7 mm×6.4 mm thick.

EXAMPLE 3

A composition and test samples were prepared substantially in accordance with the procedure of Example 2 except that 95.7 parts by weight polycarbonate of Example 1 and 4.3 parts of a selectively hydrogenated styrene-butadiene-styrene block copolymer (Shell Chemical Kraton G 1651) were used.

EXAMPLE 4

A composition and test samples were prepared substantially in accordance with the procedure of Example 2 except that 94 parts by weight of polycarbonate were used and the Kraton G 1650 was replaced with 6 parts by weight of ethylene/ethyl acrylate copolymer (Union Carbide DPD 6169).

EXAMPLE 5

A composition containing 86 parts by weight of an aromatic polycarbonate resin of Example 1, 10 parts by weight of Kraton G 1651, and 4 parts by weight of high density polyethylene (USI, LB 742) was prepared by blending the ingredients together in a laboratory tumbler. The resulting mixture was fed to an extruder operating at about 255° C. The resulting extrudate was comminuted into pellets and the pellets were injection molded into test pellets substantially in accordance with the procedure of Example 1.

EXAMPLE 6

A composition and test specimens were prepared substantially in accordance with the procedure of Example 5 except that the 4 parts by weight of high density polyethylene were replaced with 4 parts by weight of ethylene/propylene copolymer (Shell 7522).

EXAMPLE 7

A composition containing 87 parts by weight of an aromatic polycarbonate resin of Example 1, 8 parts by weight of Kraton G 1651, and 5 parts by weight of a high density polyethylene (USI, LN 742) was prepared by blending the ingredients together by physically mixing them in a laboratory tumbler. The resulting mixture was fed to an extruder operating at about 255° C. The extrudate was comminuted into pellets and the pellets were injection molded into test samples substantially in accordance with the procedure of Example 1.

EXAMPLE 8

A composition and test samples were prepared substantially in accordance with the procedure of Example 7 except that 5 parts by weight of high density polyethylene were replaced with 5 parts by weight of ethylene/propylene copolymer (Shell 7522).

The following examples illustrate compositions of the instant invention.

EXAMPLE 9

A composition and test specimens were prepared substantially in accordance with the procedure of Example 5 except that the high density polyethylene was replaced with 4 parts by weight of ethylene propylene ethylidene norbornene terpolymer (Exxon Vistalon 3708).

EXAMPLE 10

A composition and test specimens were prepared substantially in accordance with the procedure of Example 7 except that the high density polyethylene was replaced with 5 parts by weight of ethylene propylene ethylidene norbornene (Vistalon 3708).

Some of the specimens from Examples 1–10 were mounted on an ASTM stress jig (1% strain/3400 psi) and soaked for two hours at room temperature in AMOCO premiun unleaded gasoline. These specimens were removed from the jig, the gasoline allowed to evaporate at room temperature for 24 hours, and then were tested. These specimens were subjected to the Notched Izod test, ASTM D256, and the results are set forth in Table I. Other specimens from Examples 1–10 were subjected to the Notched Izod test without having been soaked in gasoline. The results of these tests are also set forth in Table I. Some of the unsoaked specimens were also tested to determine their Heat Distortion Temperature Under Load (DTUL) in accordance with ASTM D648. The results of these tests are likewise set forth in Table I.

In Table I the numerical superscripts indicate the percent of test specimens which were ductile in failure, no superscript indicating 100% ductility.

TABLE I

| Example No. | Before Soaking in Gasoline Notched Izod (kg·cm./cm.) | | After Soaking in Gasoline Notched Izod (kg·cm./cm.) | | DTUL (°C.) |
|---|---|---|---|---|---|
| | 3.2 mm | 6.4 mm | 3.2 mm | 6.4 mm | |
| 1 | 80.6 | 8.7° | broke | — | 134.5 |
| 2 | 66.4 | 57.2 | 4.9° | 4.9° | — |
| 3 | 81.7 | 76.2 | broke | — | — |
| 4 | 80.6 | 63.1 | 7.1° | 5.4° | — |
| 5 | 72.4 | 35.4 | $23.4^{40}$ | $17.7^{40}$ | 129.0 |
| 6 | 71.9 | 30.5 | $21.8^{40}$ | $17.4^{40}$ | 131.7 |
| 7 | 69.1 | 35.4 | $17.7^{40}$ | $12.0^0$ | 130.3 |
| 8 | 74.0 | 43.0 | $17.4^{40}$ | $15.8^{40}$ | 131.2 |
| 9 | 67.7 | 51.2 | 36.5 | 19.6 | 131.7 |
| 10 | 69.1 | 50.1 | 37.6 | 33.7 | 132.1 |

As clearly illustrated by the data in Table I the compositions of the instant invention (Examples 9 and 10) exhibit improved resistance to organic solvents such as gasoline, i.e., improved environmental stress crazing and cracking properties, improved ductility and improved thick section impact strength as compared with unmodified polycarbonate resin (Example 1). It is clear from this data that these improved properties are a result of the particular combination of the selectively hydrogenated linear, sequential or radial teleblock copolymer, component (ii), and the olefin-rubbery diene terpolymer, component (iii). Polycarbonate compositions containing only the selectively hydrogenated copolymer (Examples 2 and 3) do not exhibit this improved resistance to organic solvents such as gasoline, nor do they exhibit the dramatic improvement in ductility and thick section impact after exposure to gasoline shown by the instant compositions. Polycarbonate compositions containing the selectively hydrogenated copolymer and an additional modifier other than the instant olefin diene terpolymer (Example 5-8) while exhibiting some improvement in resistance to organic solvents, thick section impact and ductility after exposure to gasoline, do not exhibit as dramatic an improvement in these properties as do the instant compositions.

The instant compositions may also optionally contain the commonly known and used additives such as, for example, antioxidants; mold release agents; inert fillers such as glass fibers, glass spheres, talc, mica, clay, graphite, and carbon black; ultraviolet radiation stabilizers such as the benzophenones, benzotriazoles, cyanoacrylates, and benzylidene malonates; hydrolytic stabilizers such as the epoxides disclosed in U.S. Pat. Nos. 3,489,716, 4,138,379 and 3,839,247, all of which are incorporated herein by reference; color stabilizers such as the organophosphites disclosed in U.S. Pat. Nos. 3,305,520 and 4,118,370, both of which are incorporated herein by reference; and flame retardants.

Some particularly useful flame retardants are the alkali and alkaline earth metal salts of organic sulfonic acids. These types of flame retardants are disclose, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference. These flame retardants are present in the instant compositions in amounts effective to render the compositions flame retardant. In general these amounts range from about 0.01 to about 10 weight percent, based on the amounts of the flame retardant and components (i)-(iii) present.

The forgoing detailed description has been given for clearness of understanding only and no unnecessary limitations are to be understood or implied therefrom. The invention is not limited to the exact details shown and described herein, for obvious modifications will occur to those skilled in the art.

What is claimed is:

1. A polycarbonate composition exhibiting improved resistance to organic solvents comprising, in admixture:
   (i) at least one high molecular weight aromatic polycarbonate resin;
   (ii) at least one selectively hydrogenated linear, sequential or radial teleblock copolymer of a vinyl aromatic compound (A) and (A') independently selected from styrene, alpha-methylstyrene, p-methyl-styrene, vinyl toluene, vinyl xylene, or vinyl naphthylene and an olefinic elastomer (B) of the type A—B—A'; A—(B—A—B)$_n$—A, A(-BA)$_n$B, (A)$_4$B, B(A)$_4$ or B((AB)$_n$B)$_4$ wherein n is an integer having a value of from 1 to 10 inclusive; and
   (iii) at least one ethylene propylene diene terpolymer; components (ii) and (iii) being present in amounts at least effective to improve the solvent resistance of said polycarbonate resin.

2. The composition of claim 1 which contains from about 2 to about 30 weight percent of component (ii) and from about 1 to about 20 weight percent of component (iii), based on the total amounts of components (i), (ii) and (iii) present in the composition.

3. The composition of claim 2 which contains from about 4 to about 20 weight percent of component (ii) and from about 2 to about 15 weight percent of component (iii).

4. The composition of claim 3 which contains from about 5 to about 15 weight percent of component (ii) and from about 3 to about 10 weight percent of component (iii).

5. The composition of claim 1 wherein in said selectively hydrogenated block copolymer (B) is selected from butadiene, isoprene, 1,3-pentadiene, and 2,3-dimethyl-butadiene.

6. The composition of claim 5 wherein in said selectively hydrogenated block copolymer resin (A) is a styrene block, (B) is a diolefin block, and (A') is a styrene block.

7. The composition of claim 6 wherein in said selectively hydrogenated block copolymer resin terminal blocks (A) and (A') each have weight average molecular weights of from about 2,000 to about 60,000, and center block (B) has a weight average molecular weight of from about 20,000 to about 450,000.

8. The composition of claim 1 wherein said diene is norbornene.

9. The composition of claim 8 wherein said norbornene is ethylidene norbornene.

10. The composition of claim 1 which further contains a flame retardant amount of a flame retardant compound.

11. The composition of claim 10 wherein said flame retardant compound is selected from the alkali and alkaline earth metal salts of organic sulfonic acids.

12. The composition of claim 1 wherein said polycarbonate resin is derived from bisphenol-A and a carbonate precursor.

13. The composition of claim 12 wherein said carbonate precursor is phosgene.

* * * * *